(12) United States Patent
Ishikawa

(10) Patent No.: US 7,130,592 B2
(45) Date of Patent: Oct. 31, 2006

(54) RADIO TRANSMISSION APPARATUS AND RADIO COMMUNICATION METHOD

(75) Inventor: Kimihiko Ishikawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 435 days.

(21) Appl. No.: 10/451,658

(22) PCT Filed: Oct. 30, 2002

(86) PCT No.: PCT/JP02/11251

§ 371 (c)(1),
(2), (4) Date: Jun. 25, 2003

(87) PCT Pub. No.: WO03/039031

PCT Pub. Date: May 8, 2003

(65) Prior Publication Data

US 2004/0087282 A1    May 6, 2004

(51) Int. Cl.
*H04B 1/02*    (2006.01)

(52) U.S. Cl. .................. 455/101; 455/103; 375/299; 370/330

(58) Field of Classification Search ............... 455/101, 455/103, 561; 375/299; 370/330
See application file for complete search history.

(56) References Cited

U.S. PATENT DOCUMENTS 6,212,242 B1 *   4/2001   Smith et al. ............... 375/299
6,842,440 B1 *   1/2005   Paneth et al. ............. 370/330
2001/0006535 A1 * 7/2001   Csomo .................. 375/240.27

FOREIGN PATENT DOCUMENTS

| JP | 5597746 | 7/1980 |
| JP | 58191537 | 11/1983 |
| JP | 9214407 | 8/1997 |
| JP | 11298433 | 10/1999 |

OTHER PUBLICATIONS

T. Sugiyama, et al., "PDM-COFDM Scheme for Broadband Mobile Communication Systems", SB-3-7, Section 2, Line 6, 2001, p. 578, English translation of related part.
International Search Report dated Feb. 4, 2003.

* cited by examiner

*Primary Examiner*—Edward F. Urban
*Assistant Examiner*—Adeel Haroon
(74) *Attorney, Agent, or Firm*—Stevens, Davis, Miller & Mosher, LLP

(57) ABSTRACT

There is provided a radio transmitting apparatus capable of improving spectrum efficiency and a transmission rate while maintaining communication quality. The present apparatus adaptively selects space multiplex where different information (transmission signal A≠transmission signal B) is transmitted from a plurality of antennas with the same frequency, frequency multiplex where different information (transmission signal A≠transmission signal B) is transmitted from the plurality of antennas with different frequencies, space diversity where the same information is transmitted from the plurality of antennas with the same frequency, and frequency diversity where the same information (transmission signal A=transmission signal B) is transmitted from the plurality of antennas with different frequencies according to circumstances of a propagation path.

2 Claims, 6 Drawing Sheets

RADIO TRANSMISSION APPARATUS AND RADIO COMMUNICATION METHOD

TECHNICAL FIELD

The present invention relates to a radio transmitting apparatus and radio communication method used in a digital radio communication system.

BACKGROUND ART

Preparations for broadband radio access system are currently underway to aim at a world-wide unified standard. Moreover, there has been desired the establishment of mobile broadband radio access system for next generation, which makes good use of abundant frequency sources, toward submillimeter wave bands.

As the current broadband radio access system, there is used one in which a modulation method is orthogonal frequency division multiplex (OFDM) using a frequency band of 5 GHz under the world-wide unified standard and a modulation multiple value number corresponding to each subcarrier is adaptively controlled according to the circumstances of a propagation path. According to this method, a large modulation multiple value number can be obtained under good circumstances of the propagation path. For this reason, a transmission rate of 54 Mbps using 64-value QAM in, for example, a frequency band of 20 MHz can be attained.

In recent years, application of SDM (Space Division Multiplex) method in which space division multiplex is performed with the same frequency using a plurality of antennas has been considered in order to improve effective use of the frequency ("PDM-COFDM Scheme for Broadband Mobile Communication Systems" Sugiyama, Umehira, The Institute of Electronics, Information and Communication Engineers, Communication Society Meeting, 2001, SB-3-7). In this type of method, the modulation is the same as the conventional case, but different information is transmitted from the plurality of antennas with the same frequency to perform space multiplex. For this reason, for example, in a case where two antennas are used, the transmission capacity is doubled without increasing the frequency band to be used, so that the transmission rate is also doubled.

However, in the aforementioned conventional method, there is a case in which a receiving side cannot perform separation and reproduction of the transmission signal subjected to space multiplex in principle depending on interference from another cell and the circumstances of the propagation path. For this reason, the communication capacity is not always increased, and there is a possibility that such a case will occur where a demand for an expected transmission rate will not be met. In addition, there is a possibility that a communication impossible state will occur depending on the case.

DISCLOSURE OF THE INVENTION

An object of the present invention is to provide a radio transmitting apparatus and radio communication method that is capable of improving spectrum efficiency and a transmission rate as maintaining communication quality.

The essence of the present invention is to control each transmission frequency of a plurality of antennas and the number of information transmitted from the plurality of antennas according to circumstances of a propagation path when the same or different information is transmitted using a plurality of antennas, namely, to adaptively select space multiplex where different information is transmitted from the plurality of antennas with the same frequency, frequency multiplex where different information is transmitted from the plurality of antennas with different frequencies, space diversity where the same information is transmitted from the plurality of antennas with the same frequency, and frequency diversity where the same information is transmitted from the plurality of antennas with the different frequencies according to the circumstances of the propagation path.

The object of the invention may be achieved by a radio transmitting apparatus having a transmitter for transmitting the same or different information using a plurality of antennas, an acquirer for acquiring a circumstance of a propagation path, and a controller for determining whether the acquired circumstance is a good circumstance or a poor circumstance. In a case that the determined circumstance is a good circumstance, the controller sets the same transmission frequency for the plurality of antennas and allows the transmitter to transmit different information from the plurality of antennas. In a case that the determined circumstance is a poor circumstance, the controller sets different transmission frequencies for the plurality of antennas and allows the transmitter to transmit different information from the plurality of antennas.

BEST MODE FOR CARRYING OUT THE INVENTION

An embodiment of the present invention will be specifically explained with reference to the drawings attached herewith.

Figure 1:
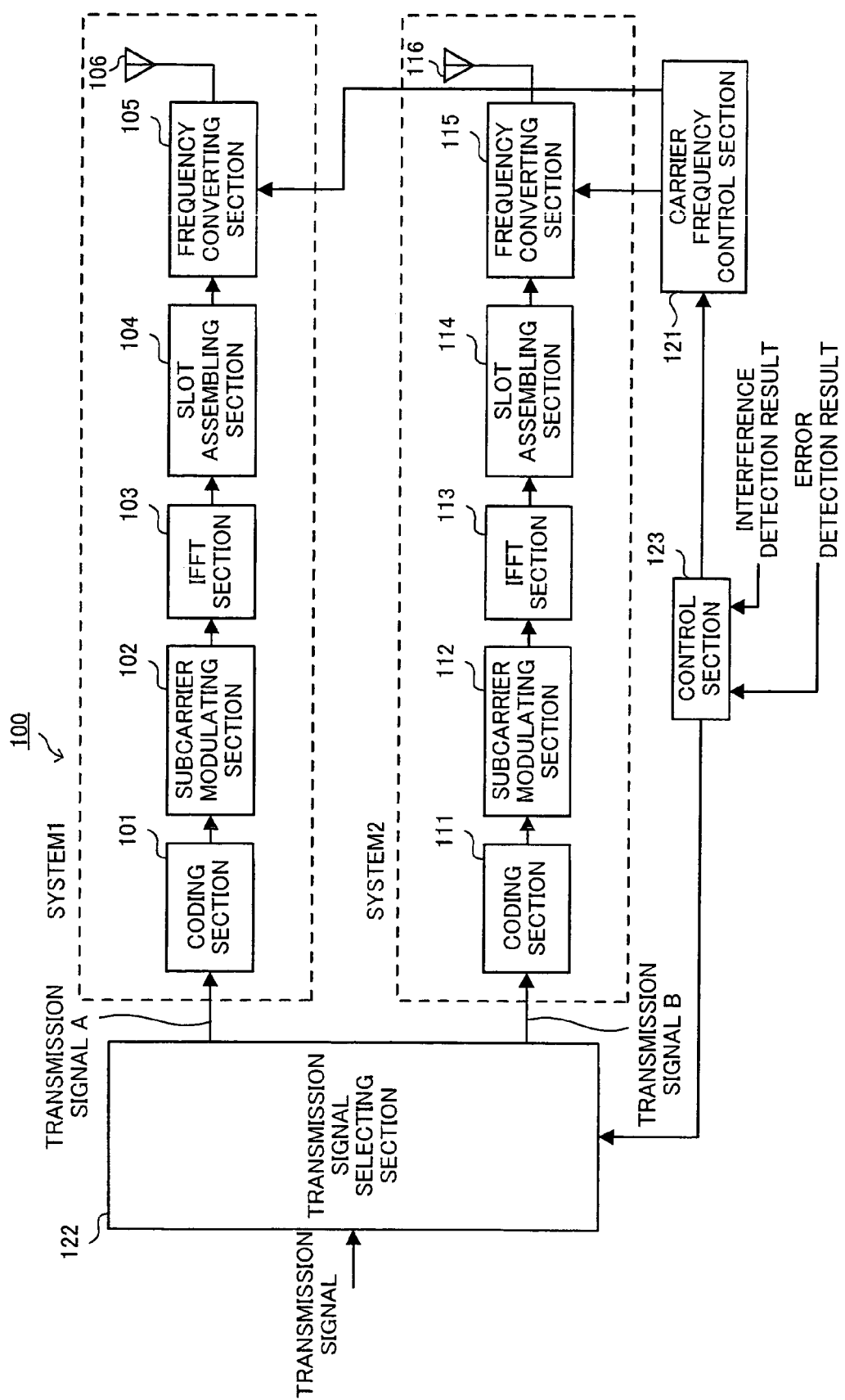
FIG. 1 is a block diagram illustrating the configuration of a radio transmitting apparatus according to one embodiment of the present invention.
Figure 2:
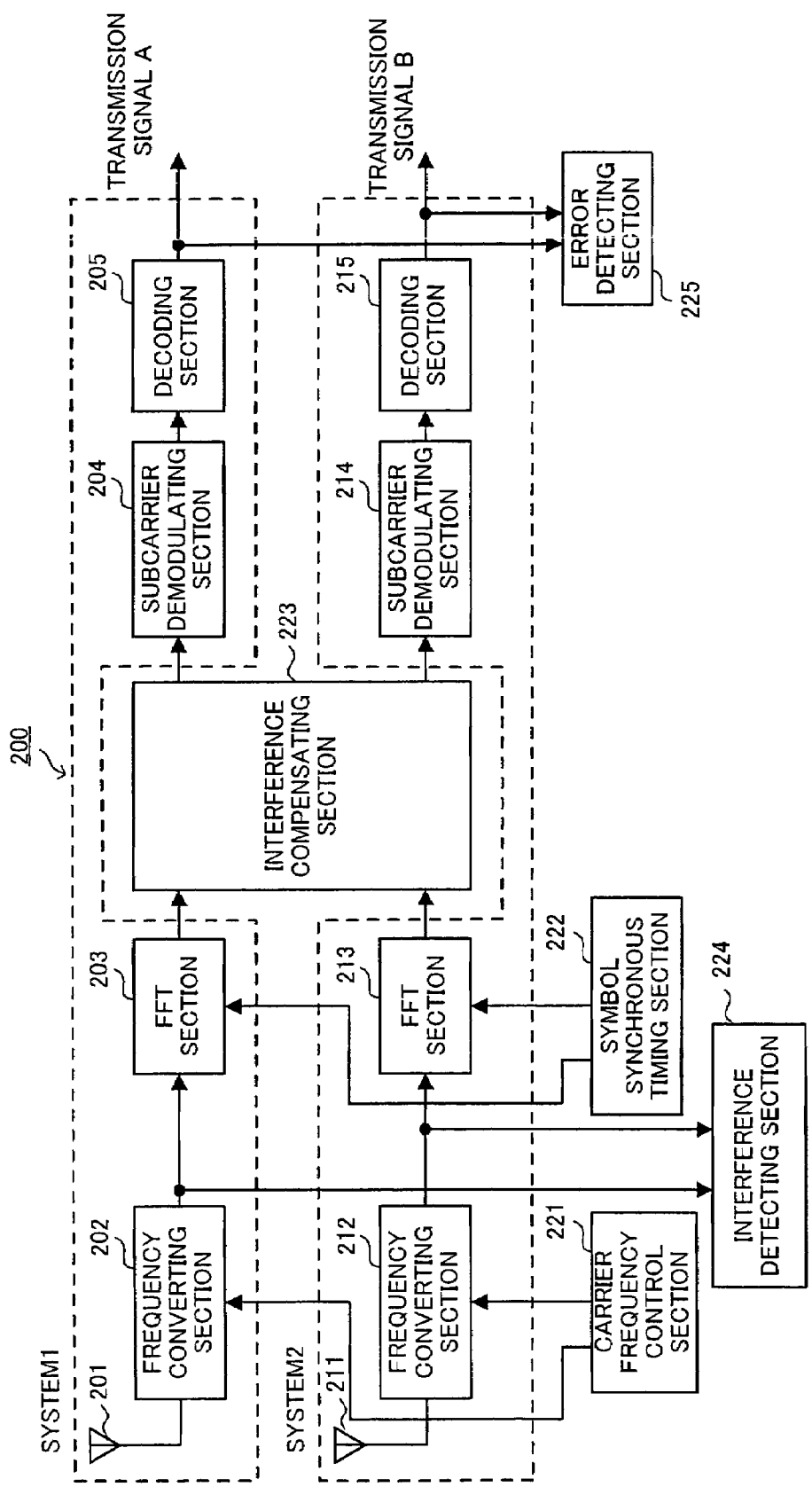
FIG. 2 is a block diagram illustrating the configuration of a radio receiving apparatus that performs radio communication with the radio transmitting apparatus illustrated in FIG. 1.

FIG. 1 is a block diagram illustrating the configuration of a radio transmitting apparatus according to one embodiment of the present invention, and FIG. 2 is a block diagram illustrating the configuration of a radio receiving apparatus that performs radio communication with the radio transmitting apparatus illustrated in FIG. 1. The radio transmitting apparatus illustrated in FIG. 1 and the radio receiving apparatus illustrated in FIG. 2 can be installed on the same radio communication apparatus.

This radio communication apparatus is an OFDM radio communication apparatus, a radio transmitting apparatus illustrated in FIG. 1 is a transmitter for OFDM signal, and a radio receiving apparatus 200 illustrated in FIG. 2 is a receiver for OFDM signal. Attention is paid to OFDM as mobile broadband radio access for next generation since the influence of multipath delay spread can be reduced in high-speed digital signal transmission by multicarrier conversion and guard interval insertion. Here, the OFDM signal is one that is obtained by multiplexing a plurality of orthogonal subcarrier signals.

According to this embodiment, when the same or different information is transmitted using a plurality of antennas in OFDM, the transmission frequency of each of the plurality of antennas and the number of information transmitted from the plurality of antennas are controlled according to the circumstances of the propagation path, thereby improving frequency use efficiency and a transmission rate while maintaining communication quality. A case in which the number of antennas is two is hereinafter explained as an example.

The radio transmitting apparatus (transmitter) 100 illustrated in FIG. 1 includes a system 1 that transmits a transmission signal A and a system 2 that transmits a transmission signal B. The system 1 is composed of a coding section 101, a subcarrier modulating section 102, an inverse fast Fourier transform (IFFT) section 103, a slot assembling section 104, a frequency converting section 105, and an antenna 106. The system 2 is composed of a coding section 111, a subcarrier modulating section 112, an inverse fast Fourier transform (IFFT) section 113, a slot assembling section 114, a frequency converting section 115, and an antenna 116. Moreover, the transmitter 100 includes a carrier frequency control section 121, a transmission signal selecting section 122, and a control section 123 for the entirety.

While, the radio receiving apparatus (receiver) 200 illustrated in FIG. 2 includes a system 1, which receives the transmission signal A from the transmitter 100 to obtain a received signal A, and a system 2, which receives the transmission signal B from the transmitter 100 to obtain a received signal B. However, when the transmission signal A and transmission signal B have the same frequency, both transmission signal A and transmission signal B are received at each system. The system 1 is composed of an antenna 201, a frequency converting section 202, a fast Fourier transform (FFT) section 203, a subcarrier demodulating section 204, and a decoding section 205. The system 2 is composed of an antenna 211, a frequency converting section 212, a fast Fourier transform (FFT) section 213, a subcarrier demodulating section 214, and a decoding section 215. Moreover, the receiver 200 includes a carrier frequency control section 221, a symbol synchronous timing section 222, an interference compensating section 223, an interference detecting section 224, and an error detecting section 225.

In addition, when the radio transmitting apparatus 100 and the radio receiving apparatus 200 are installed on the same radio communication apparatus, the antennas 106 and 116 for transmitter 100 and the antennas 201 and 211 for receiver 200 may be a transmission and reception sharing type.

An explanation will be next given of each operation of the above-configured transmitter 100 and receiver 200.

First, the operation of the transmitter 100 will be explained as follows.

The transmission signal A of the system 1 is, for example, convolutionally coded by the coding section 101. The coded signal is modulated for each subcarrier by the subcarrier modulating section 102, and thereafter the resultant is outputted to the IFFT section 103. The IFFT section 103 provides inverse fast Fourier transform (IFFT) to an output signal of the subcarrier modulating section 103 to generate an OFDM signal. A guard interval and a preamble are inserted to the generated OFDM signal by the slot assembling section 104, and thereafter the resultant is output to the frequency converting section 105. The frequency converting section 105 upconverts an output signal of the slot assembling section 104 to a radio frequency (transmission frequency), which is independently controlled by the carrier frequency control section 121. The upconverted transmission signal is transmitted via the antenna 106. Moreover, the same processing as the transmission signal A of the system 1 is provided to the transmission signal B of the system 2, and the frequency converting section 115 upconverts an output signal of the slot assembling section 114 to a radio frequency (transmission frequency), which is independently controlled by the carrier frequency control section 121, and thereafter the resultant is transmitted from the antenna 116. At this time, whether the transmission signal A of the system 1 and the transmission signal B of the system 2 are set to the same or not are selected by the transmission signal selecting section 122. Both the carrier frequency control section 121 and the transmission signal selecting section 122 are adaptively controlled by the control section 123. The contents of adaptive control to be made by the control section 123 will be specifically described later.

The operation of the receiver 200 will be explained as follows.

The OFDM signal received via the antenna 201 of the system 1 is downconverted by the frequency converting section 202 using a radio frequency (the same frequency as the transmission frequency of the antenna 106 from which the transmission signal A is transmitted), which is independently controlled by the carrier frequency control section 221, and thereafter the resultant is output to the FFT section 203 via a guard interval removing section (not shown). The FFT section 203 provides fast Fourier transform (FFT) to the OFDM signal subjected to the guard interval removal using a timing signal output from the symbol synchronous timing section 222. The same processing is provided to the OFDM signal received via the antenna 211 of the system 2. The OFDM signal is downconverted by the frequency converting section 212 using a radio frequency (the same frequency as the transmission frequency of the antenna 116 from which the transmission signal B is transmitted), which is independently controlled by the carrier frequency control section 221, and thereafter the guard interval is removed therefrom and FFT processing is performed. The interference compensating section 223 estimates a transfer function between the antennas 201 and 211 to separate the signal subjected to space multiplex. In the system 1 and the system 2, the separated signal is decoded for each subcarrier by the subcarrier decoding sections 204 and 214, respectively. A received signal A and a received signal B are thereby obtained.

At this time, the interference detecting section 224 measures an interference level for each system and detects the presence or absence of an interference wave, thereby detecting a frequency which is not assigned to the other user from a plurality of usable frequencies. Moreover, the error detecting section 225 detects an error rate (for example, BER (Bit Error Rate) and the like) as a reference that indicates the circumstances of the propagation path, the interference detection result (presence or absence of the interference wave of each system) performed by the interference detecting section 224 and the error detection result (error rate of each system) performed by the error detecting section 225 are transmitted to the control section 123 of the transmitter 100 of the other end of communication via the transmitter (not shown) installed on the same radio communication apparatus and the receiver (not shown) installed on the radio communication apparatus of the other end of communication.

An explanation will be next given of the contents of the aforementioned adaptive control at the transmitter 100 with reference to FIGS. 3 to 6. Additionally, a case in which four channels (frequency bands) including channel 1 (CH1) to channel 4 (CH4) are used is hereinafter explained as an example. Moreover, in FIGS. 3 to 6, antenna #1 denotes the antenna 106 of the system 1, and antenna #2 denotes the antenna 116 of the system 2.

In this embodiment, the transmitter 100 can use four radio communication systems. The first case is a space multiplex case, namely, a case in which different information (transmission signal A≠transmission signal B) is transmitted from two antennas 106 and 116 with the same frequency (for example, FIG. 3). The second case is a frequency multiplex case, namely, a case in which different information (transmission signal A≠transmission signal B) is transmitted from two antennas 106 and 116 with the different frequencies (for example, FIG. 4). The case system is a space diversity case, namely, a case in which the same information (transmission signal A=transmission signal B) is transmitted from two antennas 106 and 116 with the same frequency (for example, FIG. 5). The fourth case is a frequency diversity case, namely, a case in which the same information (transmission signal A=transmission signal B) is transmitted from two antennas 106 and 116 with the different frequencies (for example, FIG. 6). The control section 123 adaptively switches among these four radio communication methods based on the interference detection result (presence or absence of the interference wave of each system) from the receiver 200 installed on the same radio communication apparatus and the error detection result (error rate of each system).

Figure 3:
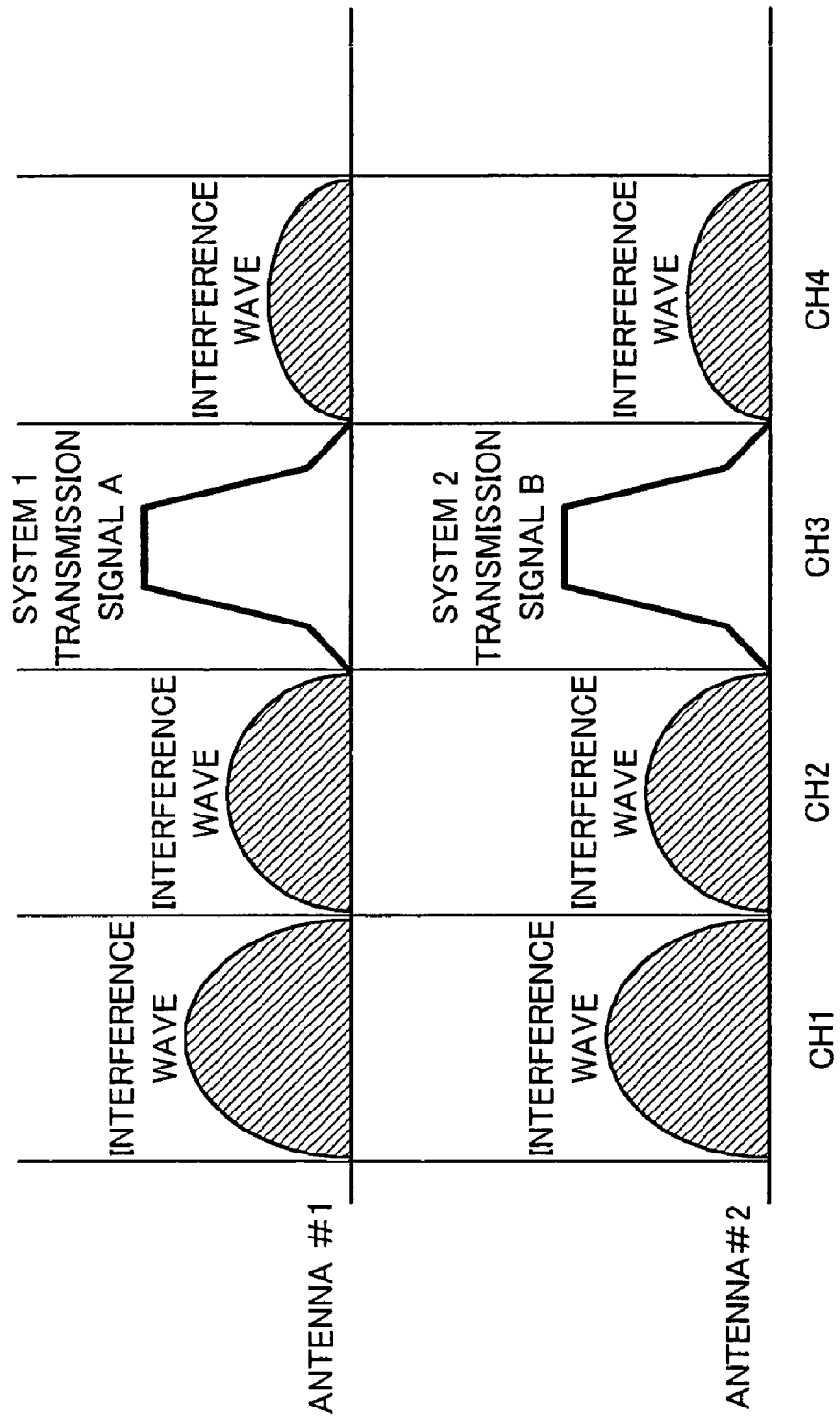
FIG. 3 is a view explaining space multiplex of the radio communication system that can be performed by the radio transmitting apparatus illustrated in FIG. 1.

More specifically, for example, when the error detection result is good, namely, the circumstances of the propagation path are good, as illustrated in FIG. 3, different information (transmission signal A≠transmission signal B) is transmitted from two antennas 106 and 116 with the same frequency and the space multiplex is thereby performed. In the example illustrated in FIG. 3, CH1, CH2, CH4 where interference waves are present, namely, frequencies (channels) that are assigned to the other users are avoided, and different transmission signals A and B are multiplexed and transmitted from the antenna 106 of the system 1 and the antenna 116 of the system 2 using the vacant same channel (CH3), respectively. Additionally, at this time, the receiver 200 performs the receiving operation using the frequency used by the transmitter 100 (frequency of CH3 in the example of FIG. 3).

According to this method, when the circumstances of the propagation path are good, the space multiplex is performed, so that the spectrum efficiency and the transmission rate can be further improved to the maximum without increasing the frequencies to be used, namely, while maintaining the frequency band to be used. In addition, frequencies with no frequency wave are detected from the plurality (four in this case) of usable frequencies (CH1 to CH4), and the transmission frequency of each of the plurality of antennas (two in this case) is set from the detected frequencies. For this reason, the spectrum efficiency and the transmission rate can be further improved without the influence of interference from the other user, namely, while maintaining the communication quality.

Figure 4:
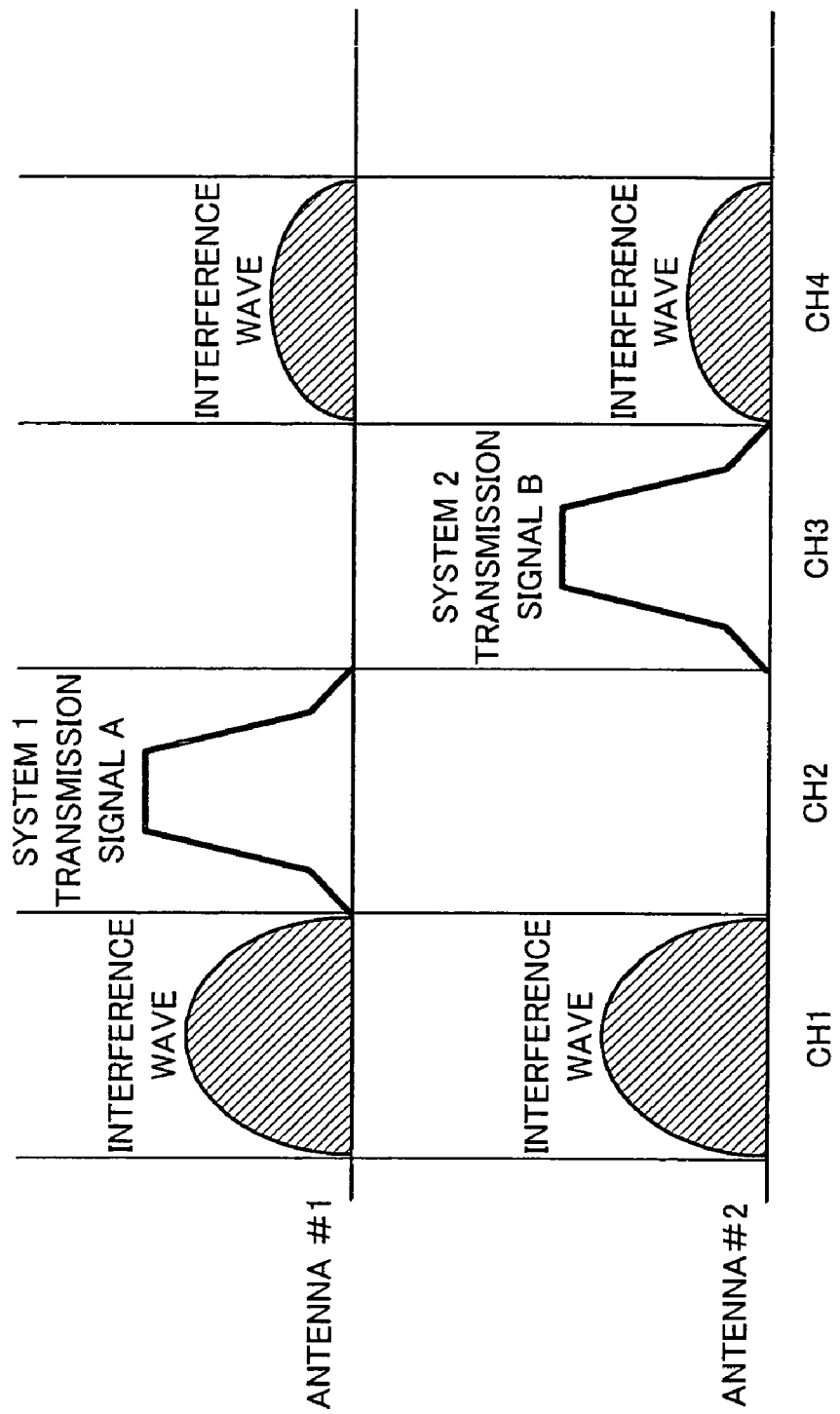
FIG. 4 is a view explaining frequency multiplex of the radio communication system that can be performed by the radio transmitting apparatus illustrated in FIG. 1.

Moreover, for example, when the error detection result is poor, namely, the circumstances of the propagation path are poor, as illustrated in FIG. 4, different information (transmission signal A≠transmission signal B) is transmitted from two antennas 106 and 116 with the different frequencies and the frequency multiplex is thereby performed. In the example illustrated in FIG. 4, CH1, CH4 where interference waves are present, namely, frequencies (channels) that are assigned to the other users are avoided, the transmission signal A is transmitted from the antenna 106 of the system 1 using one channel (CH2) of the vacant channels CH2 and CH3, and the transmission signal B different from the system 1 is transmitted from the antenna 116 of the system 2 using the other channel (CH3) different from the system 1. Additionally, at this time, the receiver 200 performs the receiving operation using the frequency of each system used by the transmitter 100 (the system 1 uses the frequency of CH2 and the system 2 uses the frequency of CH3 in the example of FIG. 4).

According to this method, when the circumstances of the propagation path are good, the frequency multiplex is performed, so that the spectrum efficiency and the transmission rate can be further improved without the influence of deterioration in the communication quality due to the space multiplex of each system, namely, while maintaining the communication quality. In addition, frequencies with no frequency wave are detected from the plurality (four in this case) of usable frequencies (CH1 to CH4), and the transmission frequency of each of the plurality of antennas (two in this case) is set from the detected frequencies. For this reason, the spectrum efficiency and the transmission rate can be further improved without the influence of interference from the other user, namely, while maintaining the communication quality.

Figure 5:
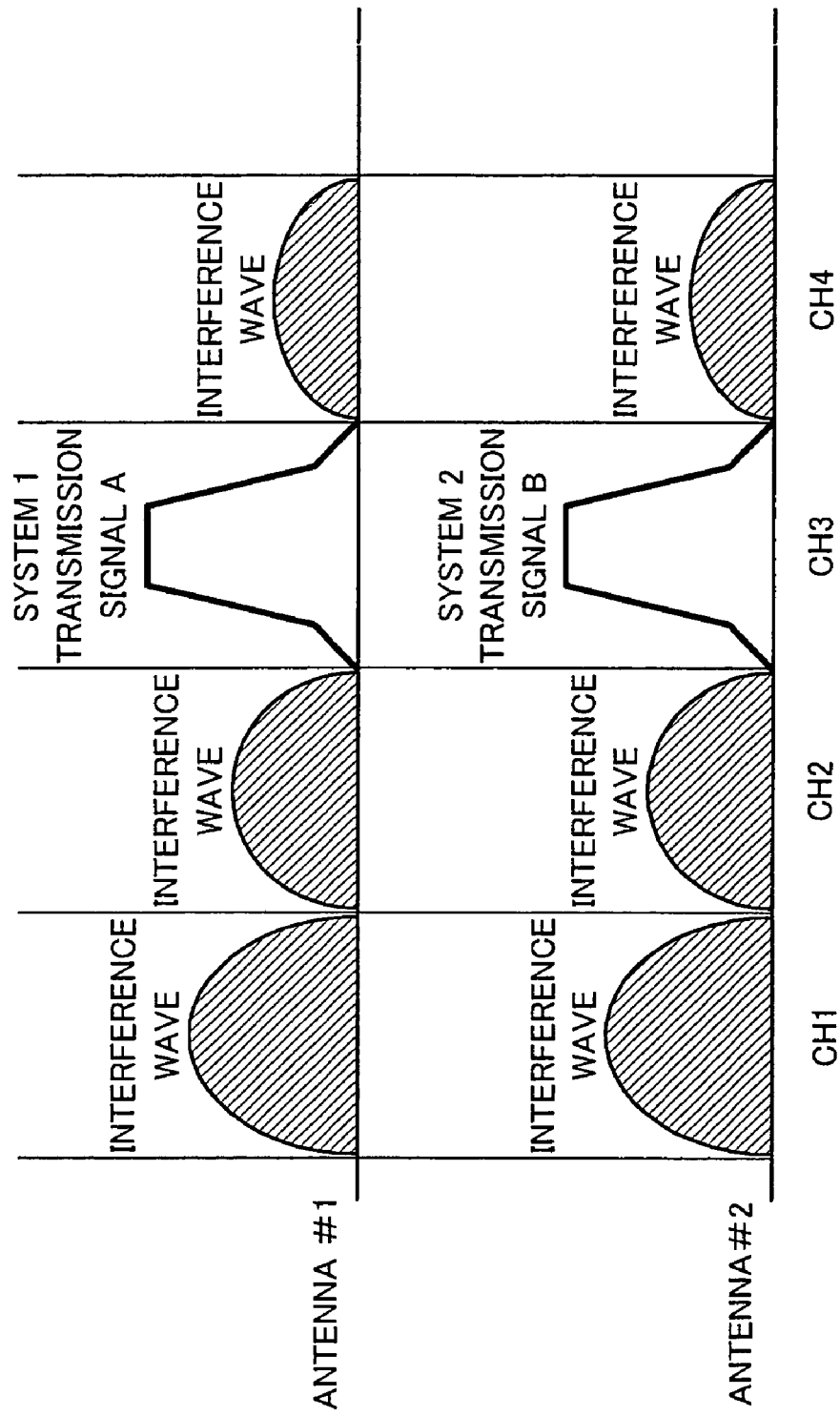
FIG. 5 is a view explaining space diversity of the radio communication system that can be performed by the radio transmitting apparatus illustrated in FIG. 1.
Figure 6:
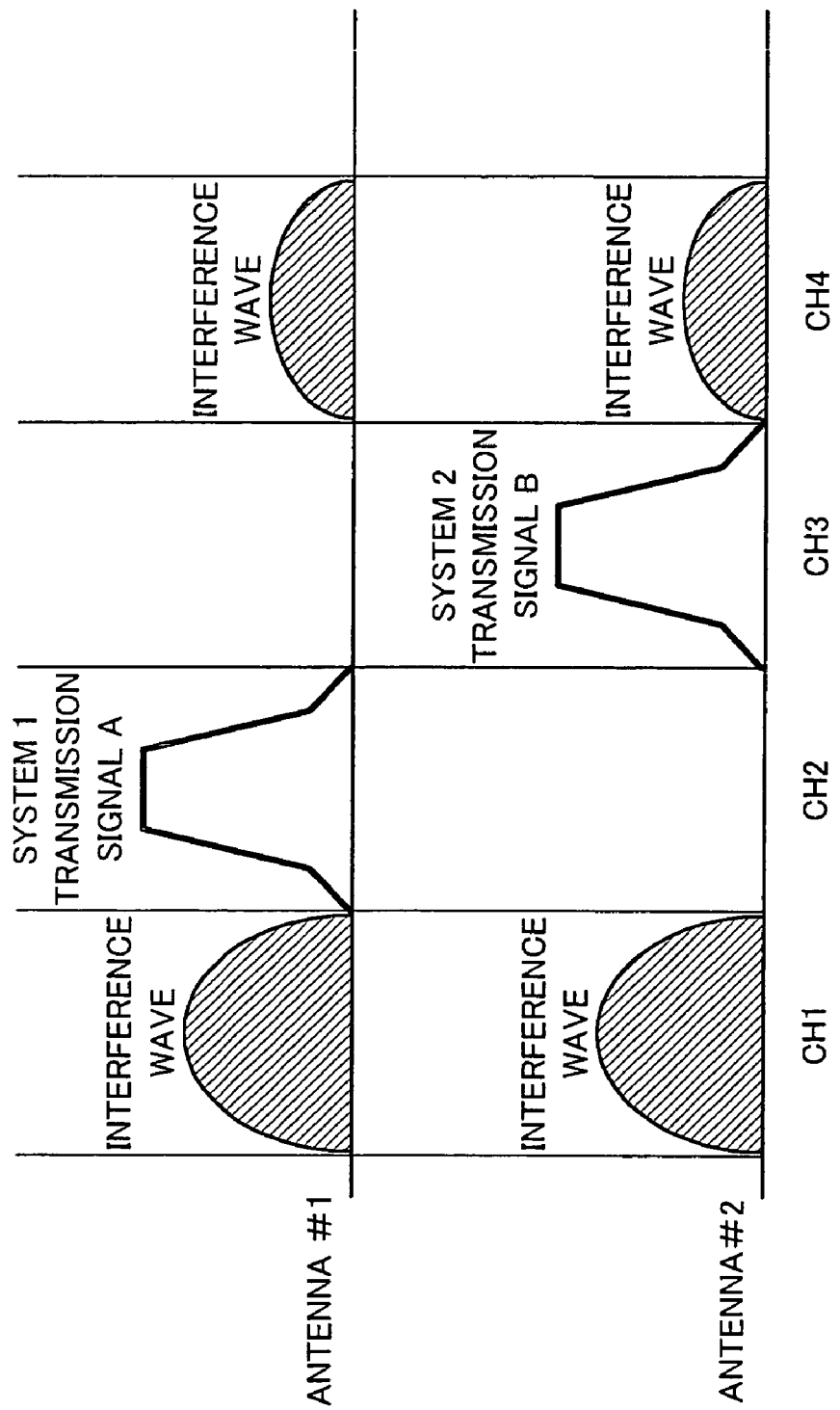
FIG. 6 is a view explaining frequency diversity of the radio communication system that can be performed by the radio transmitting apparatus illustrated in FIG. 1.

Moreover, for example, when the error detection result is extremely poor, namely, the circumstances of the propagation path are so poor that different information cannot be transmitted from the plurality of antennas, the same information (transmission A=transmission B) is selectively transmitted from two antennas 106 and 116 with. the same frequency as illustrated in FIG. 5, and the space diversity is thereby performed. Or, the same information (transmission A=transmission B) is transmitted from two antennas 106 and 116 with the different frequencies as illustrated in FIG. 6, and the frequency diversity is thereby performed. In the example illustrated in FIG. 5, CH1, CH2, CH4 where interference waves are present, namely, frequencies (channels) that are assigned to the other users are avoided, and the same transmission signal (transmission signal A=transmission signal B) is space-diversity transmitted from the antenna 106 of the system 1 and the antenna 116 of the system 2 using the vacant same channel (CH3). In the example illustrated in FIG. 6, CH1, CH4 where interference waves are present, namely, frequencies (channels) that are assigned to the other users are avoided, and the transmission signal is transmitted from the antenna 106 of the system 1 using one channel (CH2) of two vacant channels CH2 and CH3 and the same transmission signal as the system 1 (transmission signal A=transmission signal B) using the other channel (CH3) different from the system 1. Additionally, at this time, in the former case, the receiver 200 performs the receiving operation using the frequency used by the transmitter 100 (frequency of CH3 in the example of FIG. 5). In the latter case, the receiver 200 performs the receiving operation using the frequency of each system used by the transmitter 100 (the system 1 uses the frequency of CH2 and the system 2 uses the frequency of CH3 in the example of FIG. 6).

According to these methods, when the circumstances of the propagation path are extremely poor, namely, it is necessary to ensure the communication quality at the expense of improvement of the transmission rate, the space diversity or frequency diversity is performed. For this reason, even if the circumstances of the propagation path are so poor that different information cannot be transmitted from the plurality of antennas, the communication quality can be maintained by the diversity.

Thus, according to the present embodiment, when the same or different information is transmitted using the plurality of antennas 106 and 116, each transmission frequency of the plurality of antennas 106 and 116 and the number of information to be transmitted from the plurality of antennas 106 and 116 are controlled according to the circumstances of the propagation path, for example, the space multiplex, frequency multiplex, space diversity, and frequency diversity are adaptively selected according to the circumstances of the propagation path, and this makes it possible to further improve the spectrum efficiency and the transmission rate as maintaining the communication quality. In other words, both the maintenance of communication quality and further improvement of the spectrum efficiency and transmission rate can be attained.

In addition, according to this embodiment, adaptive control by the transmitter 100 is based on the idea that the same frequency is first used even if the vacant frequencies are present (in order that the other user can easily access later) and the different frequency is used when the communication quality cannot be ensured (however, there is need to detect that no interference wave is present). However, the control concept of adaptive control is not limited to this.

For example, it is possible to adopt the idea that transmission is performed with different frequencies when no interference wave is present regardless of whether the circumstances of the propagation path are good or poor. More specifically, for example, the following use can be considered. Namely, the presence or absence of the interference wave is first detected, and when no interference wave is present, different frequencies is used, and when the interference wave is detected during operation, the same frequency is used. Then, when it is detected that the interference wave disappears later, different frequencies is used again. In this case, since each transmission frequency of the plurality of antennas is set to different frequencies using the frequency with no interference wave regardless of the circumstances of the propagation path, the non-assigned, namely, vacant frequency can be freely used, and the influence of the interference from the other user can be reduced.

Moreover, this embodiment has explained the OFDM radio communication apparatus as an example. However, the present invention is not, of course, limited to the application to the OFDM system. For example, the present invention can be also applied to the CDMA (Code Division Multiple Access) radio communication apparatus.

Furthermore, the radio transmitting apparatus of the present invention can be installed on the radio communication apparatus, for example, a radio base station apparatus and a radio terminal apparatus in the mobile communication system.

As explained above, according to the present invention, the spectrum efficiency and the transmission rate can be further improved while maintaining communication quality.

This application is based on the Japanese Patent Application No. 2001-334392 filed on Oct. 31, 2001, entire content of which is expressly incorporated by reference herein.

INDUSTRIAL APPLICABILITY

The present invention can be applied to the radio apparatus such as a mobile station apparatus and a radio base station apparatus in the mobile communication system.

The invention claimed is:

1. A radio transmitting apparatus comprising:
    a transmitter that transmits the same or different information using a plurality of antennas;
    an acquirer that acquires a circumstance of a propagation path; and
    a controller that determines whether the acquired circumstance is a good circumstance, a poor circumstance, or an extremely poor circumstance, and
    in a case that the determined circumstance is the good circumstance, sets the same transmission frequency for said plurality of antennas and allows said transmitter to perform space multiplexing transmission in which different information is simultaneously transmitted from said plurality of antennas with the same transmission frequency,
    in a case that the determined circumstance is the poor circumstance but not the extremely poor circumstance, sets different transmission frequencies for said plurality of antennas and allows said transmitter to perform frecquency multiplexing transmission in which different information is simultaneously transmitted from said plurality of antennas with the different frequencies, and
    in a case that the determined circumstance is the extremely poor circumstance, sets the same transmission frequency or different transmission frequencies for said plurality of antennas and allows said transmitter to perform space diversity transmission of frequency diversity transmission in which the same information is simultaneously transmitted from said plurality of antennas with the same transmission frequency or the different transmission frequencies.

2. A radio transmitting method using a plurality of antennas, comprising:
    acquiring a circumstance of a propagation path;
    determining whether the acquired circumstance is a good circumstance, a poor circumstance, or an extremely poor circumstance;
    performing a control including (i) in a case the determined circumstance is the good circumstance, setting the same transmission frequency for said plurality of antennas and allowing space multiplexing transmission to be performed in which different information is simultaneously transmitted from said plurality of antennas with the same transmission frequency, (ii) in a case the determined circumstance is the poor circumstance but not the extremely poor circumstance, setting different transmission frequencies for said plurality of antennas and allowing frequency multiplexing transmission to be performed in which different information is simultaneously transmitted from said plurality of antennas with the different transmission frequencies, and (iii) in a case the determined circumstance is the extremely poor circumstance, setting the same transmission frequency or different transmission frequencies for said plurality of antennas and allowing space diversity transmission or frequency diversity transmission to be performed in which the same information is simultaneously transmitted from said plurality of antennas with the same transmission frequency or the different transmission frequencies; and transmitting the same or different information using said plurality of antennas according to the control.

* * * * *